US010177655B2

United States Patent
Tsuzaki et al.

(10) Patent No.: US 10,177,655 B2
(45) Date of Patent: *Jan. 8, 2019

(54) VOLTAGE REGULATOR INCLUDING A NON-REGULATED STATE DETECTION CIRCUIT

(71) Applicant: ABLIC INC., Chiba-shi, Chiba (JP)

(72) Inventors: Toshiyuki Tsuzaki, Chiba (JP); Tadashi Kurozo, Chiba (JP); Manabu Fujimura, Chiba (JP)

(73) Assignee: ABLIC INC., Chiba (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/969,688

(22) Filed: Dec. 15, 2015

(65) Prior Publication Data

US 2016/0105113 A1 Apr. 14, 2016

Related U.S. Application Data

(63) Continuation of application No. PCT/JP2014/064267, filed on May 29, 2014.

(30) Foreign Application Priority Data

Jun. 25, 2013 (JP) .................................. 2013-132965

(51) Int. Cl.
  *H02M 1/32* (2007.01)
  *H02M 3/158* (2006.01)
  *G05F 1/573* (2006.01)
  *G05F 1/571* (2006.01)

(52) U.S. Cl.
  CPC ............ *H02M 3/158* (2013.01); *G05F 1/573* (2013.01); *G05F 1/571* (2013.01); *H02M 1/32* (2013.01)

(58) Field of Classification Search
  CPC ......... H02M 3/158; H02M 1/32; G05F 1/571; G05F 1/573; G05F 1/575
  USPC .......................................................... 323/271
  See application file for complete search history.

(56) References Cited

U.S. PATENT DOCUMENTS

| 6,608,520 B1* | 8/2003 | Miyazaki | ................. | G05F 1/575 327/540 |
| 9,323,258 B2* | 4/2016 | Nakashimo | ............. | G05F 1/575 |
| 2014/0055110 A1* | 2/2014 | Richter | .................... | G05F 1/565 323/281 |
| 2014/0070778 A1* | 3/2014 | Nihei | ...................... | G05F 1/575 323/271 |

(Continued)

FOREIGN PATENT DOCUMENTS

| JP | 2003-005847 A | 1/2003 |
| JP | 2005-051854 A | 2/2005 |
| JP | 2005-301439 A | 10/2005 |

OTHER PUBLICATIONS

International Search Report, and English language translation thereof, in corresponding International Application No. PCT/JP2014/064267, dated Aug. 26, 2014, 3 pages.

*Primary Examiner* — Jue Zhang
*Assistant Examiner* — Jye-June Lee
(74) *Attorney, Agent, or Firm* — Brinks Gilson & Lione

(57) ABSTRACT

Provided is a voltage regulator capable of stably suppressing overshoot. The voltage regulator includes a non-regulated state detection circuit for detecting a non-regulated state, and an overshoot suppression circuit. The overshoot suppression circuit is configured to operate when the non-regulated state detection circuit detects the non-regulated state.

4 Claims, 3 Drawing Sheets

(56) References Cited

U.S. PATENT DOCUMENTS

2015/0188423 A1\* 7/2015 Tomioka ................ G05F 1/575
  323/282

\* cited by examiner

VOLTAGE REGULATOR INCLUDING A NON-REGULATED STATE DETECTION CIRCUIT

RELATED APPLICATIONS

The present application is a continuation of International Application PCT/JP2014/064267, with an international filing date of May 29, 2014, which claims priority to Japanese Patent Application No. 2013-132965 filed on Jun. 25, 2013, the entire contents of which are incorporated herein by reference.

BACKGROUND OF THE INVENTION

1. Field of the Invention

The present invention relates to a voltage regulator for outputting a constant voltage, and more specifically, to a technology of suppressing overshoot that occurs in an output voltage Vout.

2. Description of the Related Art

A voltage regulator inputs a high power supply voltage from a power supply such as a lithium ion secondary cell and a battery, and outputs a voltage lower than the power supply voltage to a device such as a microcontroller. For the purpose of stably operating the device such as a microcontroller, the voltage regulator is desired to prevent the occurrence of overshoot in an output voltage Vout.

FIG. 3 is a circuit diagram illustrating a related-art voltage regulator.

The related-art voltage regulator includes a reference voltage circuit 101, a differential amplifier circuit 102, an output PMOS transistor 104, a voltage divider resistor circuit 106, and an overshoot suppression circuit 300 including a differential amplifier circuit 108 and a PMOS transistor 109.

The differential amplifier circuit 102 has a non-inverting input terminal connected to an output terminal of the voltage divider resistor circuit 106, an inverting input terminal connected to the reference voltage circuit 101, and an output terminal connected to a gate of the output PMOS transistor 104. The output PMOS transistor 104 has a source connected to a power supply input terminal 10 and a drain connected to the output terminal 12. The voltage divider resistor circuit 106 is connected between an output terminal 12 and a ground terminal 11.

The voltage divider resistor circuit 106 divides an output voltage Vout of the output terminal 12 and outputs a feedback voltage Vfb. The reference voltage circuit 101 outputs a reference voltage Vref. The feedback voltage Vfb is input to the non-inverting input terminal of the differential amplifier circuit 102, and the reference voltage Vref is input to the inverting input terminal thereof. A voltage Vdrv, which is output from the output terminal of the differential amplifier circuit 102, is input to the gate of the output PMOS transistor 104. In this manner, a negative feedback circuit is formed to control the output voltage Vout of the output terminal 12 to a set voltage.

The differential amplifier circuit 108 has a non-inverting input terminal connected to the reference voltage circuit 101, an inverting input terminal connected to an output terminal of the voltage divider resistor circuit 106, and an output terminal connected to a gate of the PMOS transistor 109. The output PMOS transistor 109 has a source connected to the power supply input terminal 10 and a drain connected to the gate of the output PMOS transistor 104.

When the voltage of the output terminal 12 becomes higher than a predetermined voltage to be controlled, that is, when overshoot occurs, the feedback voltage Vfb becomes higher than the reference voltage Vref. The output voltage Vout of the differential amplifier circuit 108 decreases, with the result that the PMOS transistor 109 is turned on. As a result, the gate voltage Vdrv of the output PMOS transistor 104 becomes closer to an input voltage Vin of the power supply input terminal 10, and then the output PMOS transistor 104 is controlled to be turned off. Consequently, the overshoot suppression circuit 300 can suppress the overshoot of the output voltage Vout.

The voltage regulator cannot boost a voltage, and hence when the input voltage Vin is lower than the set voltage of the output voltage Vout, the output voltage Vout is lower than the set voltage. At this time, if the reference voltage Vref outputs a predetermined voltage, the feedback voltage Vfb is lower than the reference voltage Vref, with the result that the output voltage of the differential amplifier circuit 102 becomes a ground voltage Vss (0 V). The output PMOS transistor 104 is turned on because the gate voltage Vdry becomes 0 V. This state is referred to as "non-regulated state".

In the non-regulated state, the output PMOS transistor 104 is turned on in a non-saturated region, and then the output voltage Vout is substantially equal to the input voltage Vin. In this case, when the input voltage Vin abruptly increases, the output voltage Vout also similarly increases. When the output voltage Vout exceeds the set voltage, the gate voltage Vdrv needs to be higher than a voltage that is lower than the input voltage Vin by a threshold voltage Vth of the output PMOS transistor 104 (Vdrv>Vin−Vth). However, it takes time for the gate voltage Vdrv to increase from 0 V to the voltage, and hence the output voltage Vout exceeds the set voltage, and overshoot occurs. As a result, when the input voltage Vin abruptly increases from the non-regulated state, the largest overshoot occurs.

In order to suppress the overshoot, it is necessary to increase the gate voltage Vdrv in quick response to the abrupt increase in the input voltage Vin. This operation is performed by the overshoot suppression circuit 300.

In a regulated state in which the input voltage Vin is higher than the set voltage of the output voltage Vout, the output voltage Vout is controlled to be the set voltage, and the gate voltage Vdrv is a voltage that is lower than the input voltage Vin by approximately the threshold voltage Vth of the output PMOS transistor 104 (Vdrv≈Vin−Vth). When the input voltage Vin abruptly increases from the regulated state, the gate voltage Vdrv only needs to be changed from the voltage (Vin−Vth) to the voltage (Vdrv>Vin−Vth), which is lower than the input voltage Vin by the threshold voltage Vth. This control can be achieved by the negative feedback circuit, with the result that overshoot is small.

Accordingly, there is a problem in that, if the overshoot suppression circuit 300 operates in the regulated state so as to increase the gate voltage Vdrv to the input voltage Vin to completely turn off the output PMOS transistor 104, undershoot may occur in the output voltage Vout instead.

In the related-art voltage regulator, the overshoot suppression circuit 300 unnecessarily functions even in the regulated state so as to strongly suppress the overshoot, and hence there is a problem in that undershoot in which the voltage of the output terminal 12 becomes lower than the set voltage may occur instead.

SUMMARY OF THE INVENTION

In order to solve the above-mentioned problems, a voltage regulator according to one embodiment of the present invention includes a non-regulated state detection circuit for detecting a non-regulated state, and an overshoot suppression circuit. The overshoot suppression circuit is configured to operate when the non-regulated state detection circuit detects the non-regulated state.

According to the voltage regulator of one embodiment of the present invention, the overshoot suppression circuit is configured to operate in the non-regulated state, and hence the occurrence of overshoot can be suppressed while undershoot is prevented from occurring in the output voltage.

DETAILED DESCRIPTION OF THE PREFERRED EMBODIMENT

Figure 1:
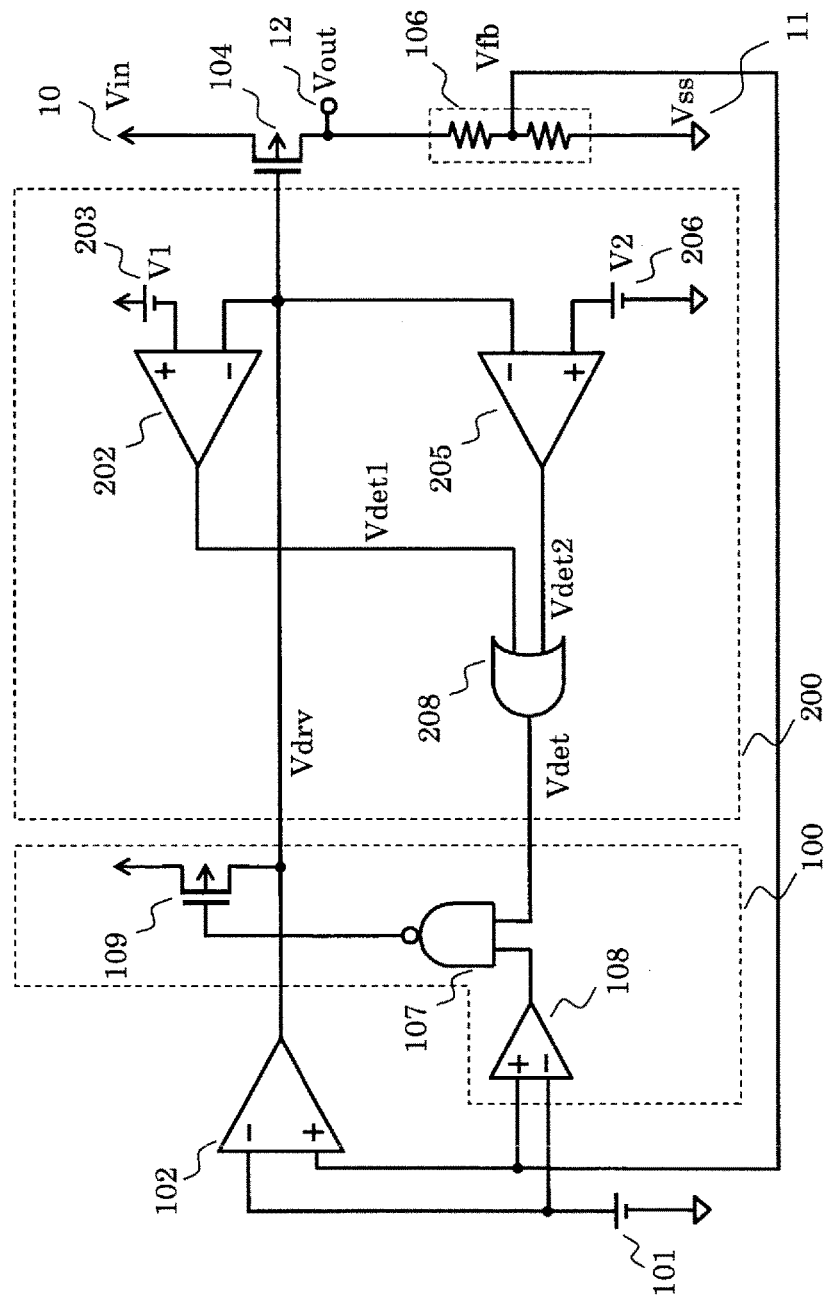
FIG. 1 is a circuit diagram illustrating a voltage regulator according to an embodiment of the present invention.

FIG. 1 is a circuit diagram illustrating a voltage regulator according to an embodiment of the present invention.

The voltage regulator according to this embodiment includes a reference voltage circuit 101, a differential amplifier circuit 102, an output PMOS transistor 104, a voltage divider resistor circuit 106, an overshoot suppression circuit 100, and a non-regulated state detection circuit 200. The overshoot suppression circuit 100 includes a NAND circuit 107, a differential amplifier circuit 108, and a PMOS transistor 109. The non-regulated state detection circuit 200 includes a comparator 202, a reference voltage circuit 203, a comparator 205, a reference voltage circuit 206, and an OR circuit 208.

The differential amplifier circuit 102 has a non-inverting input terminal connected to an output terminal of the voltage divider resistor circuit 106, an inverting input terminal connected to the reference voltage circuit 101, and an output terminal connected to a gate of the output PMOS transistor 104. The output PMOS transistor 104 has a source connected to a power supply input terminal 10 and a drain connected to an output terminal 12. The voltage divider resistor circuit 106 is connected between the output terminal 12 and a ground terminal 11. The differential amplifier circuit 108 has a non-inverting input terminal connected to the reference voltage circuit 101, an inverting input terminal connected to the output terminal of the voltage divider resistor circuit 106, and an output terminal connected to one input terminal of the NAND circuit 107. The NAND circuit 107 has an output terminal connected to a gate of the PMOS transistor 109. The PMOS transistor 109 has a source connected to the power supply input terminal 10 and a drain connected to the gate of the output PMOS transistor 104. The comparator 202 has a non-inverting input terminal connected to the reference voltage circuit 203 and an inverting input terminal connected to the output terminal of the differential amplifier circuit 102. The comparator 205 has a non-inverting input terminal connected to the reference voltage circuit 206 and an inverting input terminal connected to the output terminal of the differential amplifier circuit 102. The OR circuit 208 has one input terminal connected to an output terminal of the comparator 202, the other input terminal connected to an output terminal of the comparator 205, and an output terminal connected to the other input terminal of the NAND circuit 107.

The voltage divider resistor circuit 106 divides an output voltage Vout of the output terminal 12 and outputs a feedback voltage Vfb. The reference voltage circuit 101 outputs a reference voltage Vref. The feedback voltage Vfb is input to the non-inverting input terminal of the differential amplifier circuit 102, and the reference voltage Vref is input to the inverting input terminal thereof. A voltage Vdrv, which is output from the output terminal of the differential amplifier circuit 102, is input to the gate of the output PMOS transistor 104. In this manner, a negative feedback circuit is formed to control the output voltage Vout of the output terminal 12 to a set voltage.

The feedback voltage Vfb is input to the non-inverting input terminal of the differential amplifier circuit 108, and the reference voltage Vref is input to the inverting input terminal thereof. A voltage output from the output terminal of the differential amplifier circuit 108 is input to the gate of the PMOS transistor 109 via the NAND circuit 107. In the overshoot suppression circuit 100, the differential amplifier circuit 108 detects overshoot of the output terminal, and the PMOS transistor 109 is turned on to suppress the overshoot.

A reference voltage V1 based on an input voltage Vin, which is output from the reference voltage circuit 203, is output to the non-inverting input terminal of the comparator 202, and the gate voltage Vdrv of the output PMOS transistor 104 is input to the inverting input terminal thereof. As a result, the comparator 202 outputs a detection signal Vdet1 of High in a period during which a voltage (Vin−V1) is higher than the gate voltage Vdrv. A reference voltage V2 based on a ground voltage Vss, which is output from the reference voltage circuit 206, is input to the non-inverting input terminal of the comparator 205, and the gate voltage Vdry is input to the inverting input terminal thereof. As a result, the comparator 205 outputs a detection signal Vdet2 of High in a period during which the reference voltage V2 is higher than the gate voltage Vdrv. The OR circuit 208 inputs the detection signal Vdet1 output from the comparator 202 and the detection signal Vdet2 output from the comparator 205, and outputs an output signal Vdet to the NAND circuit 107. The OR circuit 208 outputs the detection signal Vdet of High when any one of the detection signal Vdet1 and the detection signal Vdet2 is High. As a result, the NAND circuit 107 outputs a signal of Low to the gate of the PMOS transistor 109 in a period during which the detection signal Vdet is High, that is, during a non-regulated state, in response to the signal of High that is output from the differential amplifier circuit 108 when the differential amplifier circuit 108 detects overshoot of the output terminal.

Figure 2:
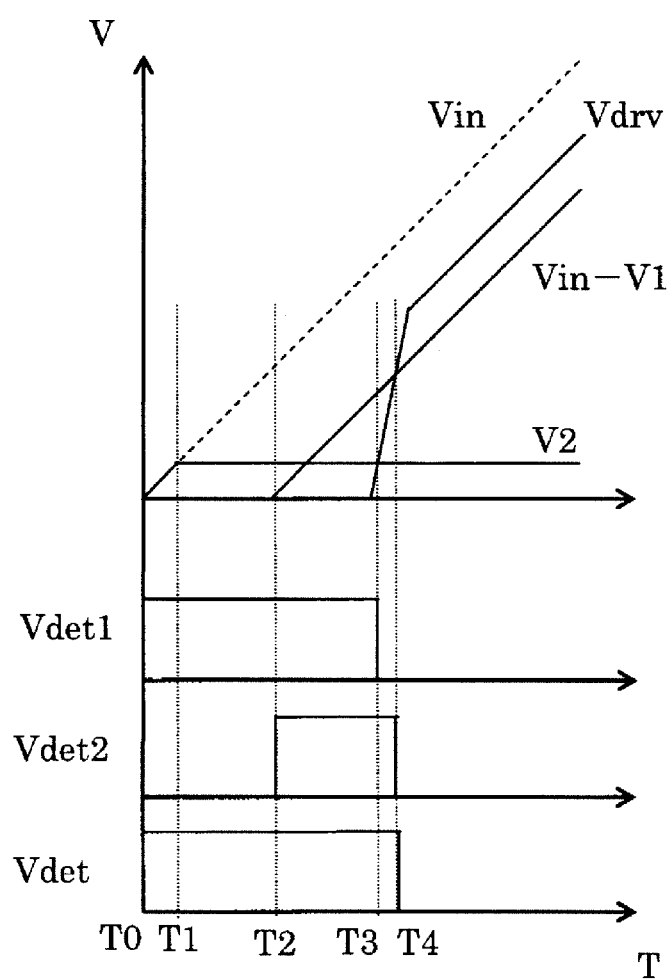
FIG. 2 is a graph showing an operation of the voltage regulator according to the embodiment of the present invention.
Figure 3:
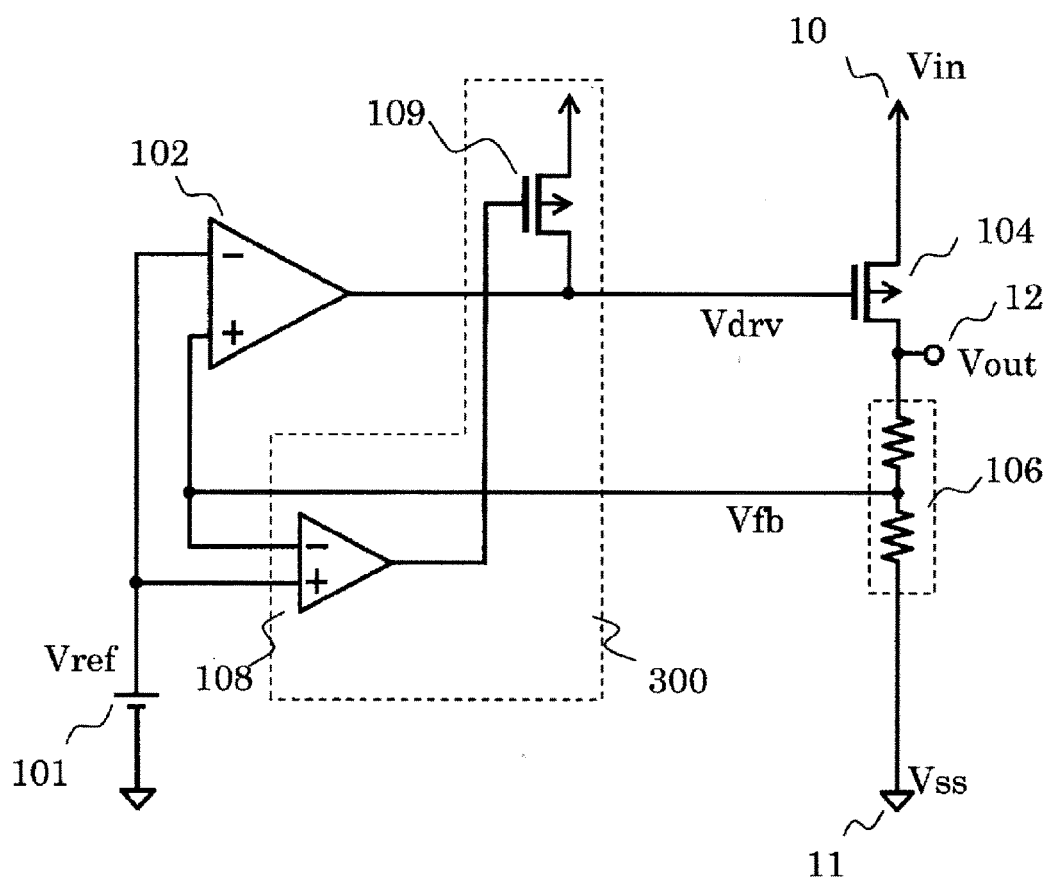
FIG. 3 is a circuit diagram illustrating a related-art voltage regulator.

FIG. 2 is a graph showing the operation of the non-regulated state detection circuit 200. The upper half of the graph of FIG. 2 shows a relationship among the gate voltage Vdrv, the voltage (Vin−V1), and the reference voltage V2 when the input voltage Vin rises. When the input voltage Vin rises, the reference voltage V2 becomes a predetermined voltage at a time T1. Next, the voltage (Vin−V1) rises at a time T2. Then, the gate voltage Vdrv rises at a time T3.

The lower half of the graph of FIG. 2 shows the detection voltage Vdet1 of the comparator output 202, the detection voltage Vdet2 of the comparator 205, and the output voltage Vdet of the OR circuit 208. The comparator 202 detects the non-regulated state when the gate voltage Vdrv is equal to or lower than the voltage (Vin−V1) (times T0 to T3), and outputs the detection signal Vdet1 of High. The comparator 205 detects the non-regulated state when the gate voltage Vdrv is equal to or lower than the reference voltage V2 (times T2 to T4), and outputs the detection signal Vdet2 of High. The OR circuit 208 outputs the detection signal Vdet of High when any one of the detection signal Vdet1 and the detection signal Vdet2 is High. Consequently, the non-regulated state can be detected in all the regions (times T0 to T4).

As described above, when the differential amplifier circuit 108 detects overshoot under the state in which the non-regulated state detection circuit 200 detects the non-regulated state and the OR circuit 208 outputs the detection signal Vdet of High, the signal for turning on the PMOS transistor 109 is output from the NAND circuit 107 of the overshoot suppression circuit 100, to thereby suppress the overshoot of the output terminal 12. Consequently, the overshoot suppression circuit 100 is prevented from operating in the regulated state, and hence the occurrence of overshoot can be suppressed while undershoot is prevented from occurring in the output voltage.

What is claimed is:

1. A voltage regulator, comprising:
   a first differential amplifier circuit having a first input connected to a voltage divider and a second Input connected to a reference voltage circuit and configured to compare a feedback voltage obtained by dividing an output voltage of an output terminal and a first reference voltage to each other and to control an output transistor,
   an overshoot suppression circuit connected to the first and second Inputs of the first differential amplifier circuit and configured to suppress an overshoot of the output voltage; and
   a non-regulated state detection circuit configured to detect a non-regulated state based on a gate voltage of the output transistor and outputs a detection voltage to the overshoot suppression circuit,
   wherein the overshoot suppression circuit is configured to suppress the overshoot of the output voltage when the non-regulated state detection circuit detects the non-regulated state to detect the overshoot.

2. A voltage regulator according to claim 1, wherein the non-regulated state detection circuit comprises:
   a first comparator for comparing the gate voltage of the output transistor and a second reference voltage to each other;
   a second comparator for comparing the gate voltage of the output transistor and a third reference voltage to each other; and
   a first logic circuit for outputting an OR of a detection signal of the first comparator and a detection signal of the second comparator.

3. A voltage regulator according to claim 2, wherein the overshoot suppression circuit comprises:
   a second differential amplifier circuit for detecting the overshoot of the output voltage;
   a second logic circuit for outputting an AND of a detection signal of the second differential amplifier circuit and a detection signal of the non-regulated state detection circuit; and
   a transistor for controlling the gate voltage of the output transistor based on an output signal of the second logic circuit.

4. A voltage regulator, comprising:
   a first differential amplifier circuit configured to compare a feedback voltage obtained by dividing an output voltage of an output terminal and a first reference voltage to each other and to control an output transistor,
   an overshoot suppression circuit configured to suppress an overshoot of the output voltage; and
   a non-regulated state detection circuit configured to detect a non-regulated state based on a gate voltage of the output transistor and including a first comparator for comparing the gate voltage of the output transistor and a second reference voltage to each other, a second comparator for comparing the gate voltage of the output transistor and a third reference voltage to each other, and a first logic circuit for outputting an OR of a detection signal of the first comparator and a detection signal of the second comparator,
   wherein the overshoot suppression circuit is configured to suppress the overshoot of the output voltage when the non-regulated state detection circuit detects the non-regulated state to detect the overshoot.

* * * * *